United States Patent
Ketchpaw et al.

(10) Patent No.: US 10,592,931 B2
(45) Date of Patent: Mar. 17, 2020

(54) PRESENTING CONTENT TO AN ONLINE SYSTEM USER PROMOTING INTERACTION WITH AN APPLICATION BASED ON INSTALLATION OF THE APPLICATION ON A CLIENT DEVICE

(71) Applicant: Facebook, Inc., Menlo Park, CA (US)

(72) Inventors: John Stephen Ketchpaw, Seattle, WA (US); Jun Li, Sammamish, WA (US); Stephanie Shum, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 941 days.

(21) Appl. No.: 14/593,968

(22) Filed: Jan. 9, 2015

(65) Prior Publication Data
US 2016/0203519 A1    Jul. 14, 2016

(51) Int. Cl.
*G06Q 30/02* (2012.01)
*G06Q 50/00* (2012.01)
*H04M 1/725* (2006.01)

(52) U.S. Cl.
CPC ..... *G06Q 30/0267* (2013.01); *G06Q 30/0277* (2013.01); *G06Q 50/01* (2013.01); *H04M 1/72525* (2013.01)

(58) Field of Classification Search
CPC ........... G06Q 30/0267; G06Q 30/0277; G06Q 50/01; H04M 1/72525
See application file for complete search history.

(56) References Cited

U.S. PATENT DOCUMENTS

| | | | | | |
|---|---|---|---|---|---|
| 6,460,036 | B1 * | 10/2002 | Herz | ...... | G06Q 30/02 |
| | | | | | 707/748 |
| 8,554,179 | B2 * | 10/2013 | Pecen | ...... | H04W 12/0027 |
| | | | | | 455/411 |
| 2011/0010244 | A1 * | 1/2011 | Hatridge | ...... | G06Q 30/00 |
| | | | | | 705/14.53 |

(Continued)

OTHER PUBLICATIONS

Markel, M., 2002. Deep linking: an ethical and legal analysis. IEEE transactions on professional communication, 45(2), pp. 77-83. (Year: 2002).*

(Continued)

*Primary Examiner* — David J Stoltenberg
*Assistant Examiner* — Robert C Johnson
(74) *Attorney, Agent, or Firm* — Fenwick & West LLP

(57) ABSTRACT

An application associated with an online system that presents content to a user via a client device determines content associated with an additional advertisement for presentation via the client device based on whether the additional advertisement is installed on the client device. If the application has been installed on the client device, content associated with the additional advertisement includes a link that, when selected, executes the application and configures the application to operate in s specific state. However, if the application has not been installed, content associated with the additional application includes a link that, when selected, retrieves information for installing the application. If the link to install the additional application is selected, the client device may be monitored to determine when the additional application has been installed. A notification identifying the additional application may subsequently be presented after installation of the additional application on the client device.

15 Claims, 3 Drawing Sheets

(56) References Cited

U.S. PATENT DOCUMENTS

| | | | | |
|---|---|---|---|---|
| 2012/0129503 A1* | 5/2012 | Lindeman | ............... | H04L 67/34 |
| | | | | 455/414.1 |
| 2014/0172911 A1* | 6/2014 | Cohen | .................... | G06F 9/445 |
| | | | | 707/770 |
| 2014/0207900 A1* | 7/2014 | Liu | .................... | G06Q 30/0246 |
| | | | | 709/216 |
| 2015/0286737 A1* | 10/2015 | Cattone | ............... | G06F 3/04842 |
| | | | | 715/234 |

OTHER PUBLICATIONS

Yan, T., Chu, D., Ganesan, D., Kansal, A. and Liu, J., Jun. 2012, Fast app launching for mobile devices using predictive user context. In Proceedings of the 10th international conference on Mobile systems, applications, and services (pp. 113-126). ACM. (Year: 2012).*

* cited by examiner

PRESENTING CONTENT TO AN ONLINE SYSTEM USER PROMOTING INTERACTION WITH AN APPLICATION BASED ON INSTALLATION OF THE APPLICATION ON A CLIENT DEVICE

BACKGROUND

This disclosure relates generally to applications, and more specifically to presenting content to a user promoting interaction with an application installed on a client device.

Online systems, such as social networking systems, present content to their users via client devices with which the users interact. Many online systems present content to a user via an application associated with the online system executing on the user's client device. The online system communicates content to the application associated with the online system, which presents the content to a user. Multiple applications associated with different online system may be executed by a user's client device, allowing the user to receive content from and interact with multiple online systems via the client device.

Additionally, entities (e.g., a business) may present content items to online system users to gain public attention for products or services or to persuade online system users to take an action regarding products or services provided by the entity. Many online systems may receive compensation from an entity for presenting certain types of content items provided by the entity to online system users. Frequently, online systems charge an entity for each presentation of certain types of content to an online system user (e.g., each "impression" of the content) or for each interaction with the certain types of content by online system users.

Content items presented to a user by an online system via an application associated with the online system may identify or promote an additional application associated with another online system or also associated with the online system. However, when determining whether to present a content item identifying an additional application to a user, conventional online systems are unable to determine whether the additional application is installed on a client device associated with the user. For example, conventional online system may present a content item to a user promoting installation of a mobile application the user has already installed. As an additional example, the advertisement publisher may present an advertisement promoting user engagement with an application that is not installed on a client device associated with the user. Presenting the user with content items promoting interaction with applications that are not installed on client device associated with the user decreases the likelihood of the user interacting with the content items, which may decrease revenue to the online system if it received compensation from an entity for user interactions with the content items. Further, presenting the user with content items promoting installation of an application that the user has already installed may also decrease revenue to the online system and may cause a third party system associated with the promoted application to provide compensation to the online system for presentation of content items promoting an action that the user has already performed. Such compensation for promoting already performed actions may discourage a third party system associated with the promoted application from further compensating the online system to present content items promoting certain interactions with the promoted application, reducing the online system's revenue.

SUMMARY

An online system, such as a social networking system, is associated with an application executing on a client device associated with the user. The online system communicates content items to the associated application executing on the client device, and the application associated with the online system presents the content items to the user via the client device. A content item communicated to the application associated with the online system includes information promoting installation of an additional application, the "advertised application," on the client device associated with the user. For example, the content item is an advertisement to install the advertised application. The content item includes content promoting installation of the advertised application as well as content promoting interaction with the advertised application.

To prevent presentation of the content item promoting installation of the advertised application when the advertised application has previously been installed on the client device associated with the user, the online system determines whether the advertised application is installed on the client device associated with the user before the content item is presented by the application executing on the client device and associated with the online system. In one embodiment, the application executing on the client device and associated with the online system retrieves information maintained by the client device identifying applications installed on the client device. The application associated with the online system may determine whether the information identifying applications installed on the client device includes information identifying the advertised application or may communicate the information identifying applications installed on the client device to the online system, which determines whether information identifying the advertised application is included in the information identifying applications installed on the client device.

If the advertised application is installed on the client device, the application associated with the online system presents content from the content item promoting interaction with the advertised application to the application associated with the online system. In some embodiments, the notification includes a link that executes the advertised application when the user accesses the link. For example, the link included in the notification includes an application identifier associated with the advertised application and one or more instructions for execution by the advertised application to configure the advertised application to a specific state. A state of the advertised application identifies data received by the advertised application as well as data presented by the advertised application. For example, when the user accesses the link included in the notification, the advertised application is executed by the client device and presents information identified by the link (e.g., a shopping cart including an item identified by the link).

However, if the advertised application is not installed on the client device associated with the user, the application associated with the online system presents content from the content item promoting installation of the advertised application to the user via the client device. For example, an advertisement for the advertised application includes a link to an application store or other entity to retrieving and installing the application is obtained from the online system by the application associated with the online system and executing on the client device for presentation to the user. If the application associated with the online system and executing on the client device receives an interaction with the link to retrieve and install the application, the application associated with the online system initiates a thread on the client device that periodically retrieves information maintained by the client device identifying applications installed on the client device. In some embodiments, the online system requests information identifying installed applications from the client device at periodic intervals, while in other embodiments, the application associated with the online system retrieves information from the client device identifying installed applications at periodic intervals.

If the thread determines the advertised application has been installed on the client device, the application associated with the online system presents a notification to the user identifying the advertised application and promoting interaction with the advertised application. For example, the notification includes the application identifier associated with the advertised application and one or more instructions for execution by the advertised application to configure the advertised application to a specific state. If the thread determines the advertised application has not been installed on the client device, the thread continues to periodically obtain information identifying applications installed by the client device and determine if the information identifying applications installed by the client device includes information identifying the advertised application. The thread may obtain information identifying applications installed by the client device at periodic intervals during a specified duration of time (e.g., a week) or until the thread determines the advertised application has been installed on the client device.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
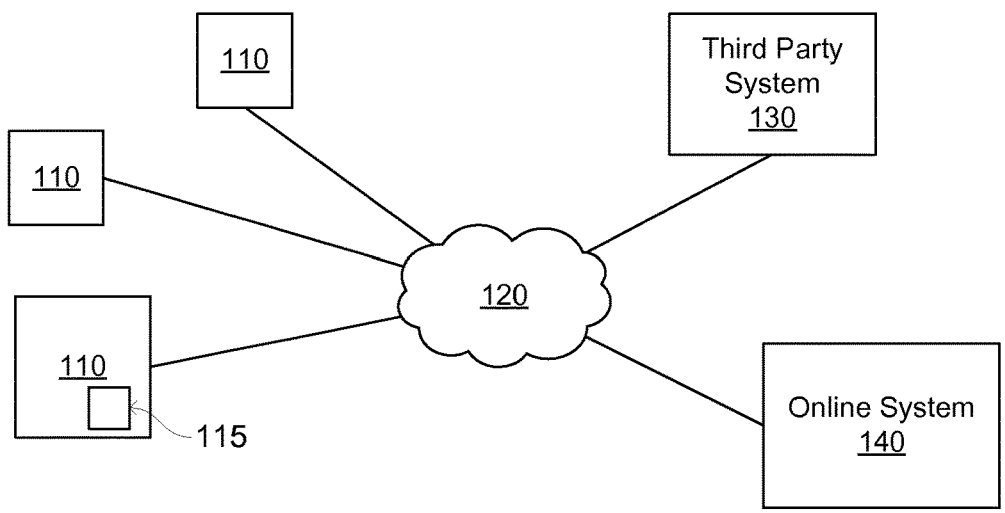
FIG. 1 is a block diagram of a system environment in which an online system operates, in accordance with an embodiment.

FIG. 1 is a block diagram of a system environment 100 in which an online system 140, such as a social networking system, operates. The system environment 100 shown by FIG. 1 comprises one or more client devices 110, a network 120, one or more third party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application 115 allowing a user of the client device 110 to interact with the online system 140. For example, a client device 110 executes a browser application to enable interaction between the client device 110 and the online system 140 via the network 120. In another embodiment, a client device 110 interacts with the online system 140 through an application 115 associated with the online system 140 and running on a native operating system of the client device 110, such as IOS® or ANDROID™.

One or more applications 115 may be installed on a client device 110 and executed by the client device 110 to provide a user of the client device 110 with content from the online system 140, with content from one or more third party systems 130, or with other functionality. For example, an application obtains gaming content from a third party system 130 and presents the gaming content to the user. As an additional example, an application 115 receives geographic coordinates and navigation directions from a third party system 130 and presents the navigation direction to the user. The client device 110 maintains information identifying applications installed on the client device 110. For example, application identifiers associated with each application installed on the client device 110 are included in a storage device of the client device 110. Other information associated with an application 115 installed on the client device 110 may be associated with the application's application identifier. For example, a name of the application 115, an amount of memory or other client device resources allocated to the application 115, a time when the application 115 was most recently executed, an amount of time spent by a user accessing the application 115, a third party system 130 associated with the application 115, or a genre (e.g., game, navigation, music, etc.) of the application 115 are associated with a stored application identifier.

Additionally, a client device 110 includes an application 115 associated with the online system 140 that obtains content from the online system 140 and presents the content to the user of the client device. For example, the application 115 associated with the online system 140 obtains content items selected by the online system 140 for presentation to the user and presents the obtained content items via the client device 110. The application 115 associated with the online system 140 also retrieves information identifying applications 115 installed on the client device 110, which may be used by the online system 140 or by the application 115 associated with the online system 140 to select content for presentation to the user. For example, if a content item obtained by the online system 115 promotes an additional application (an "advertised application"), content included in the content item is modified based on whether the client device 110 maintains information indicating the advertised application has been installed. Determining content for presentation based on whether an application is identified by the client device 110 as installed is further described below in conjunction with FIG. 3.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications 115 for execution by a client device 110 (e.g., data or instructions for installing an application 115) or communicating data to client devices 110 for use by an application 115 executing on the client device 110 (e.g., content for presentation by an application 115). In other embodiments, a third party system 130 provides content or other information for presentation via a client device 110. A third party system 130 may also communicate information to the online system 140, such as advertisements, content, or information about an application provided by the third party system 130.

Figure 2:
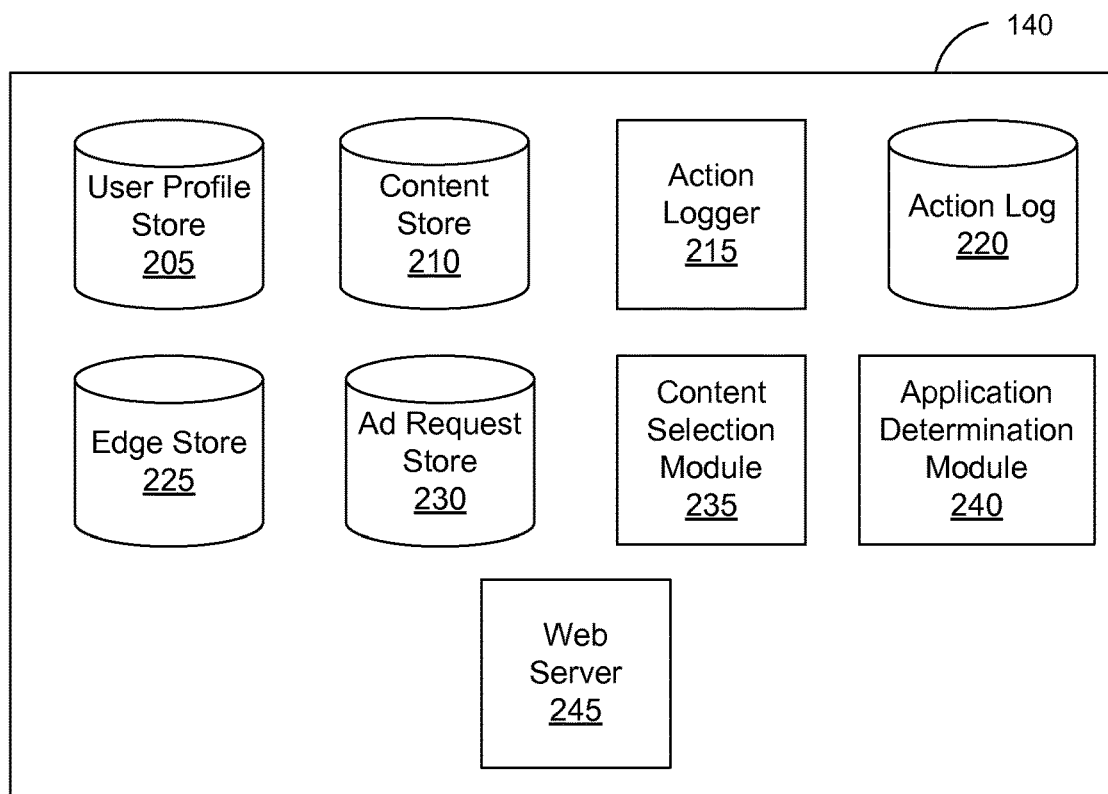
FIG. 2 is a block diagram of an online system, in accordance with an embodiment.

FIG. 2 is a block diagram of an architecture of the online system 140. The publisher 140 shown in FIG. 2 includes a user profile store 205, a content store 210, an action logger 215, an action log 220, an edge store 225, an ad request store 230, a content selection module 235, an application determination module 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other publisher application users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made (e.g., purchases of mobile applications), and other patterns from shopping and buying. Additionally, actions a user performs via an application 115 associated with a third party system 130 and executing on a client device 110 may be communicated to the action log 220 by the application 115 for recordation and association with the user by the online system 140.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. An edge between a user and another user may be associated with a connection strength specified by the user and providing information about a relationship between the user and the other user. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, the rate or amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user of the online system 140 based on the actions performed by the user. A user's affinity may be computed by the online system 140 over time to approximate a user's interest in an object, a topic, or another user of the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are stored in the ad request store 235. An advertisement request includes advertisement content (also referred to as an "advertisement") and a bid amount. The advertisement content is text data, image data, audio data, video data, or any other data suitable for presentation to a user. In various embodiments, the advertisement content also includes a network address specifying a landing page to which a user is directed when the advertisement is accessed. Additionally, the advertisement content may include information that, when executed by a client device 110, causes the client device 110 to execute an application 115 installed on the client device 110 or obtain information for installing an application 115 on the client device 110. For example, the advertisement content includes a link to a third party system 130 for obtaining and installing an application 115, a link to execute an application 115, or instructions to execute an application 115 that specify information for presentation by the application 115 when executed. In some embodiments, an ad request includes advertisement content and alternative advertisement content, and the advertisement content or alternative advertisement content is selected for presentation based on one or more characteristics, such as whether an application associated with the ad request is installed on a client device 110 on which the advertisement content is to be presented.

The bid amount is associated with an advertisement by an advertiser and specifies an amount of compensation the advertiser provides the online system 140 if the advertisement is presented to a user or accessed by a user. In one embodiment, the bid amount is used by the online system 140 to determine an expected value, such as monetary compensation, received by the online system 140 for presenting the advertisement to a user, if the advertisement receives a user interaction, or based on any other suitable condition. For example, the bid amount specifies a monetary amount that the online system 140 receives from the advertiser if the advertisement is displayed and the expected value is determined based on the bid amount and a probability of a user accessing the displayed advertisement. In some embodiments, the expected value to the online system 140 of presenting the advertisement content may be determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. The targeting criteria may also specify interactions between a user and objects performed external to the online system 140, such as on a third party system 130. For example, targeting criteria identifies users that have taken a particular action, such as sent a message to another user, used an application 115, joined a group, left a group, joined an event, generated an event description, purchased or reviewed a product or service using an online marketplace, requested information from a third party system 130, installed an application 115, or any other suitable action. Including actions in targeting criteria allows advertisers to further refine users eligible to be presented with content from an advertisement request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the viewing user. For example, the content selection module 235 determines measures of relevance of various content items to the user based on characteristics associated with the user by the online system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, stories or other data associated with users connected to the identified user are retrieved. Additionally, one or more advertisement requests ("ad requests") may be retrieved from the ad request store 230 The retrieved stories, ad requests, or other content items, are analyzed by the content selection module 235 to identify candidate content that is likely to be relevant to the identified user. For example, stories associated with users not connected to the identified user or stories associated with users for which the identified user has less than a threshold affinity are discarded as candidate content. Based on various criteria, the content selection module 235 selects one or more of the content items or ad requests identified as candidate content for presentation to the identified user. The selected content items or ad requests are included in a feed of content that is presented to the user. For example, the feed of content includes at least a threshold number of content items describing actions associated with users connected to the user via the online system 140. The content selection module 235 communicates the selected content items or advertisements to the web server 245 for communication to an application 115 associated with the online system 140 executing on a client device 110 associated with the identified user for presentation.

In one embodiment, the online system 140 allows its users to exchange messages with each other and presents a user with a thread including multiple messages exchanged between users. For example, the thread includes messages exchanged between the user and an additional user. Alternatively, the thread includes messages between the user and multiple additional users. An application associated with the online system 140 may execute on client devices 110 associated with various users; the application communicates messages received from a user to the online system 140 for presentation to one or more additional users via a thread and presents messages received from one or more other users to the user via the online system 140 to the user via a thread. In this embodiment, the content selection module 235 may include one or more advertisements or selected content items, as further described below in conjunction with FIG. 3, in a thread presented to a user along with messages for presentation to the user.

The application determination module 240 determines whether an application 115 is installed on a client device 110 associated with an online system user. In some embodiments, the application determination module 240 periodically requests information from the client device 110 identifying applications 115 installed on the client device 110. The application determination module 240 compares information identifying the application to the information identifying applications 115 installed on the client device 110, and determines the application 115 is installed on the client device 110 if the information identifying in the application 115 is included in the information identifying applications 115 installed on the client device 110. For example, the application determination module 240 determines whether an application identifier associated with a particular application 115 is included in application identifiers obtained from the client device 110 that correspond to applications 115 installed on the client device 110. In some embodiments, the application determination module 240 periodically obtains information identifying applications 115 installed on the client device from the client device 110 and compares information identifying the application 115 to the obtained information. The application determination module 240 may communicate information identifying an application 115 and instructions to an application 115 associated with the online system 140 and executing on the client device 110. When the application 115 associated with the online system 140 executes the instructions, the application 115 associated with the online system 140 retrieves information maintained by the client device 110 identifying applications 115 installed on the client device 110 and determines whether the information identifying the application 115 is included in the retrieved information identifying applications 115 installed on the client device 110. Determination of whether an application 115 is installed on a client device 110 is further described below in conjunction with FIG. 3.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or BlackberryOS.

Determining Advertisement Content to Promote Interaction with an Application

Figure 3:
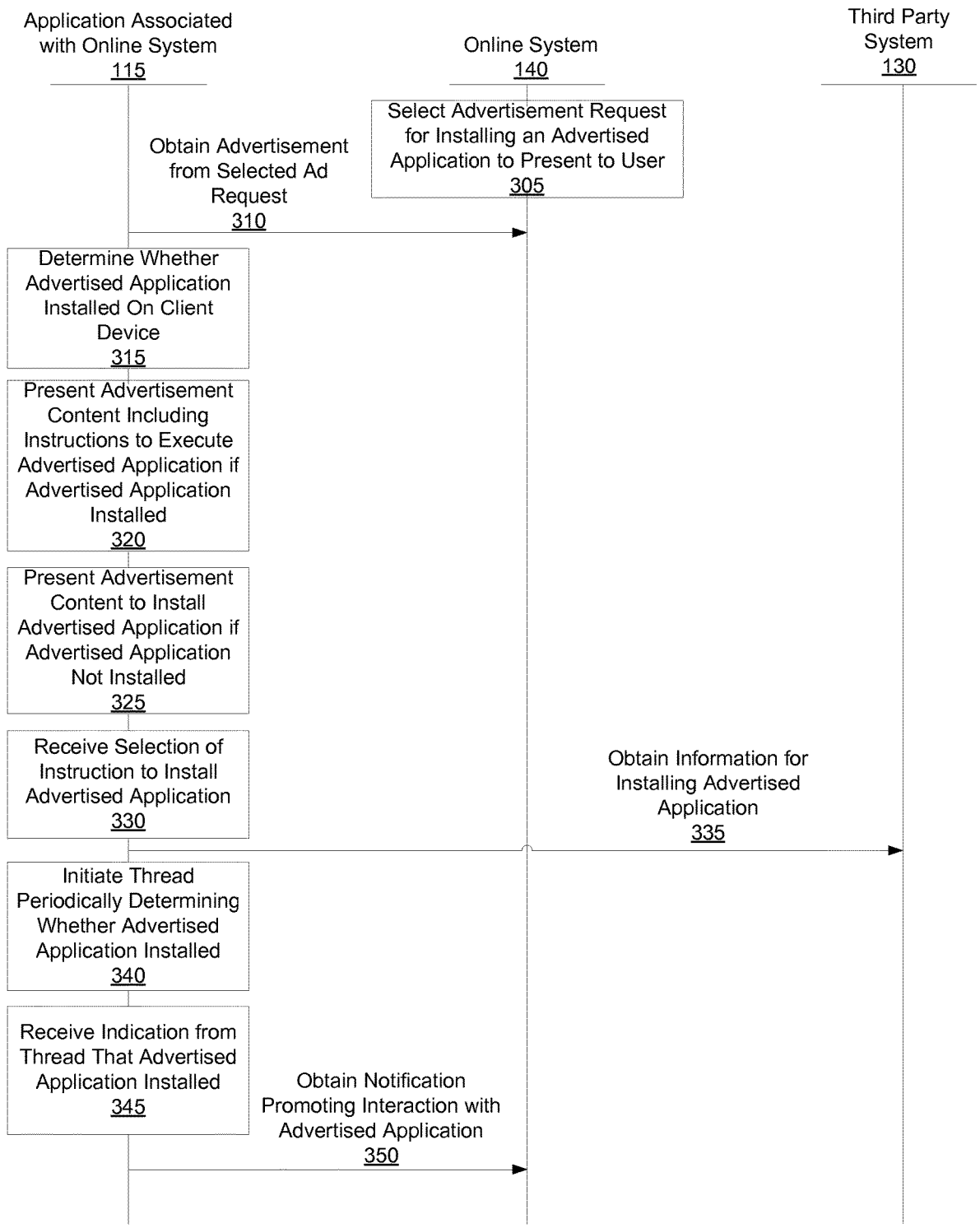
FIG. 3 is an interaction diagram of a method for selecting content to promote interaction with an application, in accordance with an embodiment.

FIG. 3 is an interaction diagram of one embodiment of a method for selecting content to promote interaction with an application. In other embodiments, the method may include different and/or additional steps than those shown in FIG. 3. Additionally, steps of the method may be performed in different orders than the order described in conjunction with FIG. 3.

The online system 140 selects 305 an advertisement request ("ad request") including an advertisement promoting interaction with an application (the "advertised application") for presentation to the user. For example, the ad request includes an advertisement prompting the user to install the advertised application and an alternative advertisement prompting the user to interact with the advertised application. An advertisement included in the ad request may include a link that, when accessed by a user, causes retrieval of information for installing the advertised application from a third party system 130 associated with the advertised application; additionally, the advertisement, or an alternative application, included in the ad request may include instructions that, when executed by a client device 110 on which the advertised application is installed, executes the advertised application on the client device 110. As described above in conjunction with FIG. 2, the ad request may be selected 305 based in part on a bid amount included in the ad request.

An application 115 associated with the online system 140 and executing on a client device 110 obtains 310 the advertisement from the selected ad request, and may also obtain 310 the alternative advertisement from the selected ad request. For example, the online system 140 communicates the advertisement from the selected ad request to the application 115 associated with the online system 140 after selecting 305 the ad request. As another example, the application 115 associated with the online system 140 requests content form the online system 140, and the content provided by the online system 140 includes the advertisement from the selected ad request.

Before presenting the advertisement, which promotes interaction with the advertised application, the application 115 associated with the online system 140 and executing on the client device 110 determines 315 whether the advertised application is installed on the client device 110. For example, the application 115 associated with the online system 140 communicates a request to an operating system of the client device 110 to retrieve information stored by the client device 110 that identifies applications installed on the client device 110 and compares information identifying the advertised application to the information stored by the client device 110 that identifies applications installed on the client device 110. As another example, the application 115 associated with the online system 140 determines whether information identifying applications installed on the client device 110 includes an application identifier associated with the advertised application. Alternatively, the online system 140 itself may request information form the client device 110 identifying applications installed on the client device 110 and determine 315 whether the information identifying application installed on the client device 110 indicates the advertised application is installed on the client device 110. In other embodiments, the client device 110 receives information identifying the advertised application, determines if the advertised application is installed on the client device 110, and communicates a response to the online system 140 indicating whether the advertised application is installed on the client device. If the online system 140 determines 315 whether the advertised application is installed on the client device 110, the online system 140 may determine 315 whether the advertised application is installed on the client device 110 before the application associated with the online system 140 obtains 310 the advertisement.

In some embodiments, if the application 115 associated with the online system 140, or the online system 140, determines 315 the advertised application is installed on the client device 110, the application 115 associated with the online system 140 presents 320 the advertisement including instructions that, when executed by the client device 110, cause the client device 110 to execute the advertised application. For example, the advertisement includes a link that, when selected by a user of the client device 110, causes the client device 110 to execute one or more instructions that execute the advertised application on the client device 110. In some embodiments, the advertisement includes a link identifying the advertised application and one or more instructions for execution by the advertised application to configure the advertised application to a specific state. A state of the advertised application identifies data received by the advertised application as well as data presented by the advertised application. For example, when the user accesses the link included in the advertisement, the advertised application is executed by the client device and presents information identified by the link (e.g., a shopping cart including an item identified by the link).

Additionally, the advertisement may include content associated with the advertised application (e.g., prior interactions by the user with the advertised application) or interface elements for performing actions with the online system 140 (e.g., indicate a preference for the advertised application, share the application with an additional user, etc.). Information associated with the user by the online system 140 may be used to identify content included in the advertisement. For example, a link including instructions that, when executed by the client device 110, execute the advertised application on the client device 110 is included in the selected advertisement if the online system 140 includes information indicating the user has not previously interacted with the advertised application, while a link including instructions that, when executed by the client device 110, execute the advertised application so a state of the application specified by the instructions is presented if a threshold amount of time has elapsed between a current time and a time of a prior interaction by the user with the advertised application. In some embodiments, if the application 115 associated with the online system 140, or the online system 140, determines 315 the advertised application is installed on the client device 110, another advertisement is obtained from the online system 140 for presentation to the user rather than the selected application.

However, if the application 115 associated with the online system 140, or the online system 140, determines 315 the advertised application is not installed on the client device 110, the application 115 associated with the online system 140 presents 325 the advertisement including instructions that, when executed by the client device 110, cause the client device 110 to retrieve information for installing the advertised application. For example, if information included in the client device 110 identifying applications installed on the client device 110 does not include an application identifier, or other information, associated with the advertised application, the online system 140 or the application 115 associated with the online system 140 determines 315 the advertised application is not installed on the client device 110. In one embodiment, the application 115 associated with the online system 140 presents an alternative advertisement from the selected ad request including a link that causes the client device 110 to execute instructions that retrieve information for installing the advertised application from a third party system 130 (or from the online system 140) when the link is selected. The link may include an application identifier for the advertised application and a network address of a third party system 130 that maintains information for installing the advertised application. Additional information may also be included in the presented advertisement.

If the application 115 associated with the online system 140 receives 330 a selection of an instruction to install the advertised application, the application 115 associated with the online system 140 obtains 335 information for installing the advertised application from a third party system 130 associated with the advertised application. In some embodiments, after receiving 330 the selection of the instruction to install the advertised application, the application 115 associated with the online system 140 communicates an instruction to the client device 110 to obtain 335 information for installing the advertised application from the third party system 130. Additionally, in response to receiving 330 the selection of the instruction to install the advertised application, the application 115 associated with the online system 140 initiates 340 a thread on the client device 110 that periodically determines whether the advertised application has been installed on the client device 110. The thread may be executed by the application 115 associated with the online system 140 and periodically determines whether information stored on the client device 110 indicating applications installed on the client device 140 includes an application identifier, or other information, associated with the advertised application. In various embodiments, the thread periodically determines whether information included on the client device 110 indicates the advertised application has been installed on the client device 110 for a specified duration (e.g., one week, one month). For example, the thread retrieves information stored on the client device 110 identifying applications installed on the client device 110 at 15 minute intervals and determines whether the stored information includes information identifying the advertised application. Alternatively, the thread periodically determines whether information included on the client device 110 indicates the advertised application has been installed on the client device 110 until the thread determines the advertised application has been installed on the client device 110. In some embodiments, the application 115 associated with the online system 140 communicates a request to the online system 140 to initiate 340 the thread 340, causing the online system 140 to periodically request information from the client device 110 indicating whether the advertised application has been installed on the client device 110 (e.g., a value indicating the advertised application has been installed, information identifying applications installed on the client device 110).

When the application 115 associated with the online system 140 receives 345 an indication from the thread that the advertised application has been installed on the client device 110, the application 115 associated with the online system 140 obtains 350 a notification promoting interaction with the advertised application. The notification may be obtained 350 from the online system 140, from the third party system 140 associated with the advertised application, from information on the client device 110 associated with the application 115 associated with the online system 140, or from any other suitable source. The notification may include a link that, when executed by the client device 110, executes the advertised application on the client device. In some embodiments, the notification included in the link includes one or more instructions that are communicated to the advertised application for execution when the user selects the link, executing the instructions configures the advertised application to a specific state. Hence, the notification promotes user interaction with the advertisement to increase interaction with the advertisement after its installation on the client device 110. The notification may be presented to the user through any suitable communication channel. For example, the notification is presented to the user via a text message, an email, a notification message, a message presented via the application 115 associated with the online system 140, or through any suitable communication channel.

Example Advertisement Content and Notification

Figure 4A:
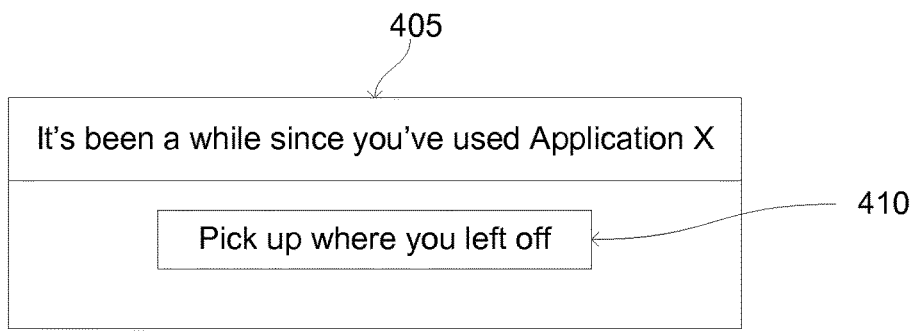
FIG. 4A is an example of an advertisement for an application that is presented if the application is installed on a client device, in accordance with an embodiment.

FIG. 4A is an example advertisement 405 presented to a user when an application is installed on a client device 110. The advertisement 405 includes information identifying the application and a link 410 that, when executed by the client device 110 on which the advertisement 405 is presented, executes the application. In some embodiments, the link 410 includes instructions that are communicated to the application when the link is selected. The application executes the instructions and is presented in a state determined by the instructions. In some embodiments, the advertisement 405 includes interface elements allowing the user to perform other interactions with the advertisement 405, such as indicating a preference for the advertisement 405 to the online system 140, providing a comment associated with the advertisement 405 to the online system 140, sharing the advertisement 405 with one or more additional users of the online system 140, or hiding the advertisement 405.

Figure 4B:
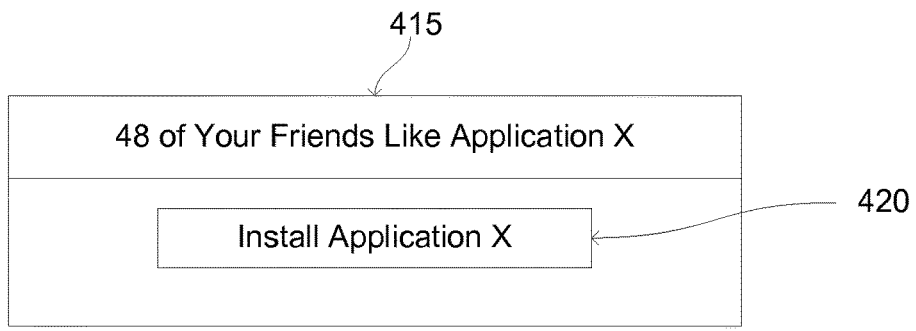
FIG. 4B is an example of an advertisement for an advertised application that is presented if the application is not installed on a client device, in accordance with an embodiment.

FIG. 4B is an example advertisement 415 presented to a user when an application is not installed on a client device 110. The advertisement 415 identifies the application, and may include additional information associated with the application. For example, the advertisement 415 identifies a number of additional users of an online system 140 connected to the user who have indicated a preference for the application, who have installed the application, or who have performed any suitable interaction with the application. The advertisement 415 includes a link 420 that, when executed by the client device 110 on which the advertisement 415 is presented, retrieves information for installing the application from a third party system 130 associated with the application, from the online system 140, or from another source. In some embodiments, the advertisement 415 includes interface elements allowing the user to perform other interactions with the advertisement 415, such as indicating a preference for the advertisement 415 to the online system 140, providing a comment associated with the advertisement 415 to the online system 140, sharing the advertisement 415 with one or more additional users of the online system 140, or hiding the advertisement 415.

Figure 4C:
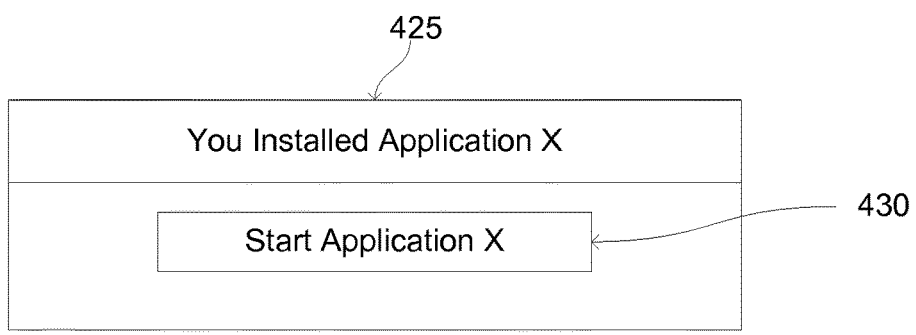
FIG. 4C is an example of a notification presented when an application was installed on a client device after presentation of an advertisement to install the application, in accordance with an embodiment.

FIG. 4C is an example of a notification 425 presented when an application was installed on a client device 110 after presentation of an advertisement to install the application. The notification 425 includes information identifying the application and a link 430 that, when executed by the client device 110 on which the notification 425 is presented, executes the application. In some embodiments, the notification 425 includes interface elements allowing the user to perform other interactions with the notification 425, such as hide the notification 425 or request subsequent presentation of the notification 425 at a later time.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
obtaining an advertisement at an application of an online system on a client device to present to a user via the client device, the advertisement including a particular page of a third-party application;
determining whether the third-party application is installed on the client device;
responsive to determining that the third-party application is not installed on the client device, presenting the advertisement to the user, the advertisement including an installation link to install the third-party application;
responsive to receiving a user selection of the installation link to install the application, initiating, by the application of the online system, a thread on the client device that periodically collects application installation information to determine whether the third-party application has been successfully installed on the client device, a determination based on a comparison between an application identifier of the third-party application and application identifiers of applications stored on the client device;

receiving an indication from the thread that the third-party application has been installed on the client device;

responsive to receiving the indication that the third-party application has been installed on the client device, providing a notification promoting interaction with the installed third-party application for presentation to the user via the client device, the notification including a deep link comprising one or more instructions communicated to the third-party application that, when executed by the third-party application, configures the third-party application to a specific state within the third-party application corresponding to the particular page; and responsive to receiving a selection of the notification from the user via the client device, causing the one or more instructions to be executed by the third-party application for presenting the particular page of the third-party application to the user on the client device.

2. The method of claim 1, further comprising:

responsive to determining that the third-party application is installed on the client device and that the user has not interacted with the third-party application for at least a threshold period of time, presenting the advertisement to the user for display on the client device, the advertisement including a link that executes the third-party application on the client device so the third-party application is configured to a state specified by one or more instructions included in the link.

3. The method of claim 1, wherein determining whether the third-party application is installed on the client device comprises:

communicating a request to an operating system running on the client device for information identifying one or more applications installed on the client device;

receiving information identifying the one or more applications installed on the client device; and determining whether the application is installed on the client device based at least in part on the information identifying the one or more applications installed on the client device.

4. The method of claim 1, wherein the advertisement is presented by an application executing on the client device and associated with a social networking system.

5. The method of claim 1, wherein the client device comprises a mobile device.

6. The method of claim 1, wherein the notification is presented to the user via one or more selected from a group consisting of: a text message, an email, a push notification, a message presented by an application executing on the client device and associated with an online system, and any combination thereof.

7. The method of claim 1, wherein the notification includes a link that executes the installed third-party application on the client device when selected by the user.

8. The method of claim 1, wherein the notification includes a link that executes the third-party application on the client device so that the third-party application is configured to a state specified by one or more instructions included in the link.

9. The method of claim 1, wherein the thread on the client device periodically determines whether the third-party application has been installed on the client device during a specified time interval.

10. A computer program product comprising a computer-readable storage medium having instructions encoded thereon that, when executed by a processor, cause the processor to:

obtain an advertisement at an application of an online system on a client device to present to a user via the client device, the advertisement including a particular page of a third-party application;

determine whether the third-party application is installed on the client device;

responsive to determining that the third-party application is not installed on the client device, present the advertisement to the user, the advertisement including an installation link to install the third-party application;

responsive to receiving a user selection of the installation link to install the third-party application, initiate, by the application of the online system, a thread on the client device that periodically collects application installation information to determine whether the third-party application has been successfully installed on the client device, a determination based on a comparison between an application identifier of the third-party application and application identifiers of applications stored on the client device;

receive an indication from the thread that the third-party application has been installed on the client device;

responsive to receiving the indication that that the third-party application has been installed on the client device, provide a notification promoting interaction with the installed third-party application for presentation to the user via the client device, the notification including a deep link comprising one or more instructions communicated to the third-party application that, when executed by the third-party application, configures the third-party application to a specific state within the third-party application corresponding to the particular page; and responsive to receiving a selection of the notification from the user via the client device, causing the one or more instructions to be executed by the third-party application for presenting the particular page of the third-party application to the user on the client device.

11. The computer program product of claim 10, wherein the computer-readable storage medium further has instructions encoded thereon that, when executed by the processor, cause the processor to:

responsive to determining that the third-party application is installed on the client device and that the user has not interacted with the third-party application for at least a threshold period of time, present the advertisement to the user for display on the client device, the advertisement including a link that executes the third-party application on the client device so the third-party application is configured to a state specified by one or more instructions included in the link.

12. The computer program product of claim 10, wherein determine whether the third-party application is installed on the client device comprises:

communicate a request to an operating system running on the client device for information identifying one or more applications installed on the client device;

receive information identifying the one or more applications installed on the client device; and determine whether the third-party application is installed on the client device based at least in part on the information identifying the one or more applications installed on the client device.

13. The computer program product of claim 10, wherein the notification is presented to the user via one or more selected from a group consisting of: a text message, an email, a push notification, a message presented by an application executing on the client device and associated with an online system, and any combination thereof.

14. The computer program product of claim 10, wherein the notification includes a link that executes the installed third-party application on the client device when selected by the user.

15. The computer program product of claim 10, wherein the notification includes a link that executes the third-party application on the client device so the third-party application is configured to a state specified by one or more instructions included in the link.

* * * * *